United States Patent [19]
Goeken

[11] Patent Number: 4,463,785
[45] Date of Patent: Aug. 7, 1984

[54] ROUTER ADAPTER FOR RADIAL ARM SAW

[76] Inventor: George W. Goeken, 412 Langdon, Alton, Ill. 62002

[21] Appl. No.: 469,045

[22] Filed: Feb. 23, 1983

[51] Int. Cl.³ .............................................. B27C 5/10
[52] U.S. Cl. .................... 144/1 F; 144/35 A
[58] Field of Search ...................... 144/1 R, 1 F, 35 A, 144/134 D, 136 C; 408/26; 83/471.2, 471.3

[56] References Cited
U.S. PATENT DOCUMENTS

| | | | |
|---|---|---|---|
| 2,888,965 | 6/1959 | Phillips | 144/1 R |
| 3,099,298 | 7/1963 | Bellini | 144/1 F |
| 4,312,391 | 1/1982 | Snow | 144/1 F |
| 4,397,342 | 8/1983 | North | 144/1 F |

Primary Examiner—W. D. Bray
Attorney, Agent, or Firm—Kalish & Gilster

[57] ABSTRACT

A router adapter is provided for use with a radial arm saw for converting same into an over-arm router which adopter comprising a mounting plate detachably engageable upon an arm of the saw motor supporting bracket or yoke for swingability with the carriage for some bracket; with there being no direct connection to the radial arm of the saw. Secured on said mounting plate a fixed clamp-forming element for receiving the inner portion the motor casing of a pre-selected router, and with there being a cooperative movable clamp-forming element for embracing the outer portion of such casing with a component for securing said movable clamp-forming element and depending below said mounting plate for preventing the propulsion of injury-productive particles from the work during routing operation.

5 Claims, 5 Drawing Figures

ROUTER ADAPTER FOR RADIAL ARM SAW

BACKGROUND AND SUMMARY OF THE INVENTION

This invention relates in general to power driven tools, and, more particularly, to an adapter for converting a radial arm saw into a router of over-arm character, being thus rendered capable of complete adjustability laterally or vertically.

Heretofore, numerous efforts have been expended for attempting to mount a router upon a conventional radial arm saw. One such prior attempt is revealed in Kreusler U.S. Pat. No. 4,084,629 wherein a router clamp is provided with components for direct attachment to the arm of a radial saw arm; therebeing a bridge plate fixed to a pair of inverted L-shaped brackets for engaging the saw arm, and with cylindrical collar members engaged to, and depending from, the said brackets. Kreuser gives no suggestion of how the supported router relates to the saw. But clearly Kreusler does not utilize the swingability of the carriage for the saw to render the router versatile; much less suggest longitudinal traversing capabilities of the router clamp by virtue of its direct, tight engagement to the arm.

Other current efforts for converting a radial arm saw having generally comprehended the expedient of directly engaging a fixture or adapter to the shaft of saw motor. Exemplary of this arrangement is disclosed in Bellini U.S. Pat. No. 3,099,298. Therein the saw blade is removed from its shaft and replaced by a pulley for operative connection to another shaft which supports a chuck for accepting the particular bit for the work to be performed. Thus, Bellini's structure deomonstrates a complete lack of universality, being an especially constructed router for connection to the saw drive shaft for power purposes. The Snow U.S. Pat. No. 4,312,391 also discloses a router adapter for radial arm saws which is designed to be directly secured upon the saw motor shaft as well as portions attachable to the saw motor housing. Snow's device incorporates an elaborate plate-support for the router together with clamps connected to said plate support for assisting to maintaining the router in position.

Thus the prior art is devoid of simplicity of construction, as well as being indicative of a propensity for connecting the earlier structures to the saw motor shaft or radial arm. These efforts have not proved efficacious in use.

Therefore, it is an object to provide an adapter for radial arm saws for converting same into an over-arm router whereby a broad gamut of routing or milling-type operations are achievable by virtue of the lateral and vertical mobility of the saw support.

It is another object of the invention to provide a routing adapter or converter of the character stated which is useful with a comprehensive line of radial arm saws, and which permits use of routers of varying manufacture and dimension, such as, for instance, within the popular range of approximately three to four and one-half inches, more commonly designed for individual or home usage.

It is a further object of the present invention to provide an adapter of the character stated which is of simple, yet highly durable construction being designed for facile, rapid mounting upon a radial arm saw with equal ease and speed of dissassembly.

It is an additional object of the present invention to provide a router adapter for radial arm saws which involves no means of direct attachment to the radial arm of the saw, so that the router may benefit in its range of adjustability to the same extent provided normally by the saw arm.

It is a further object of the present invehtion to provide a routing adapter for radial arm saws, the use of which provides the user with a pair of tools supported upon a common base whereas heretofore individual units had been required to provide the desired capabilities.

It is an additional object of the present invention to provide a router adapter for use with radial arm saws wherein there is no connection to the shaft of the saw motor, but rather the adapter is mounted at an angle of at least 90° to the axis of such saw motor.

It is a still further object of the present invention to provide a routing adapter or converter of the character stated which is economically manufactured; which is extremely reliable in usage; the use of which does not require developed skill on the part of the individual operator; which renders the mounted router available for all the various modes of routing operations, many of which will permit freedom of the user's hands for work holding or manipulating purposes; and which is resistant to damage so as to assure of longevity of use.

DESCRIPTION OF THE PREFERRED EMBODIMENT

Figure 1:
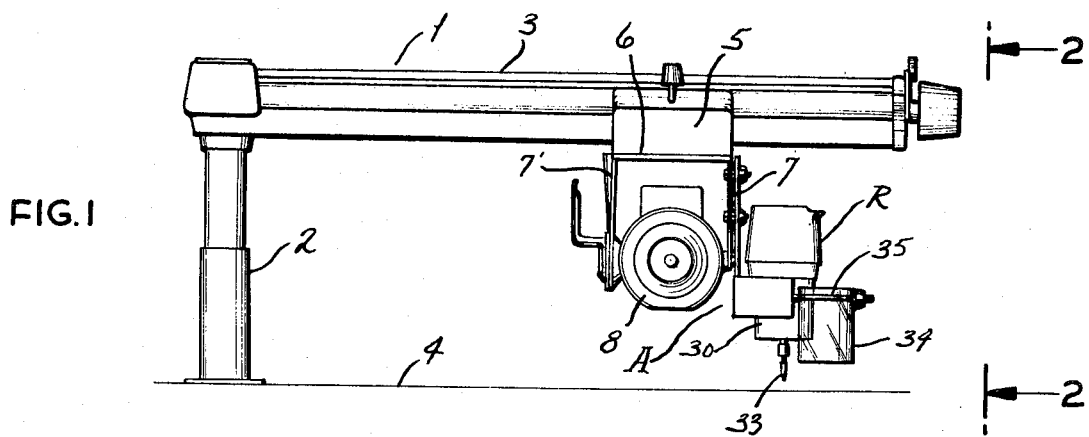
FIG. 1 is a side elevational view of a router adapter constructed in accordance with and embodying the present invention, illustrating the adapter in router-supporting operative, mounted disposition upon a radial arm saw.

Referring now by reference numerals to the drawings which illustrate the present invention, 1 generally designates a conventional radial arm saw comprising the usual vertically adjustable standard or column 2 having a radial arm 3 engaged upon the upper end thereof and projecting outwardly therefrom in axial perpendicular relationship and elevated above a work table or surface, indicated at 4. Radial arm 3 in accordance with customary construction is adapted for swingability about column 2 within a horizontal plane for permitting of desired adjustment to present the saw to the work.

Figure 3:
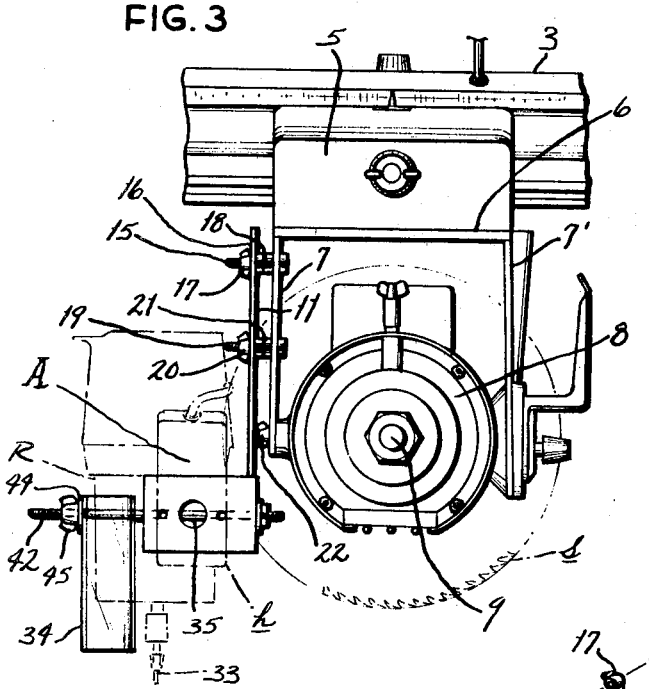
FIG. 3 is a fragmentary side view taken on the line 3—3 of FIG. 2.
Figure 2:
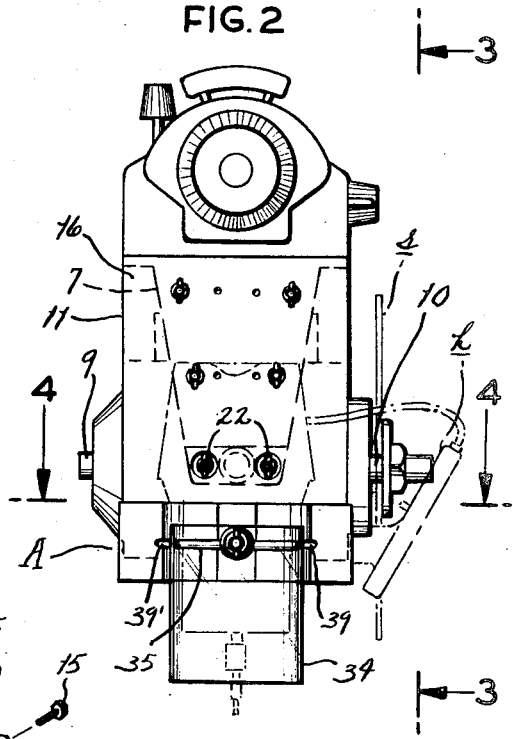
FIG. 2 is an end view taken on the line 2—2 of FIG. 1.

Provided for traverse lengthwise of radial arm 3 is a carriage 5 adjustably securable in any selected location along its path of travel. Said carriage 5 embodies a downwardly opening U-shaped bracket 6 having planarwise parallel depending plate-forming arms 7,7' for supporting therebetween the lower end portion of a motor 8, as by bolts or other fastening means (not shown). Motor 8 is provided with the customary shaft 9 which projects at both its ends beyond the adjacent ends of motor 8 and at one end, as at 10, normally, mounts the usual circular saw blade, being indicated in phantom lines as at s in FIGS. 2 and 3.

The foregoing thus generally describes a radial arm saw which per se does not constitute the present invention but does constitute a part thereof by virtue of being convertible through the adapter to be set forth below for router operation. Accordingly as will now be described radial arm saw 1 may thus be modified with facility and usage for routing purposes thereby enhancing the versatility of said saw 1 and providing the individual user with two tools instead of one.

Figure 5:
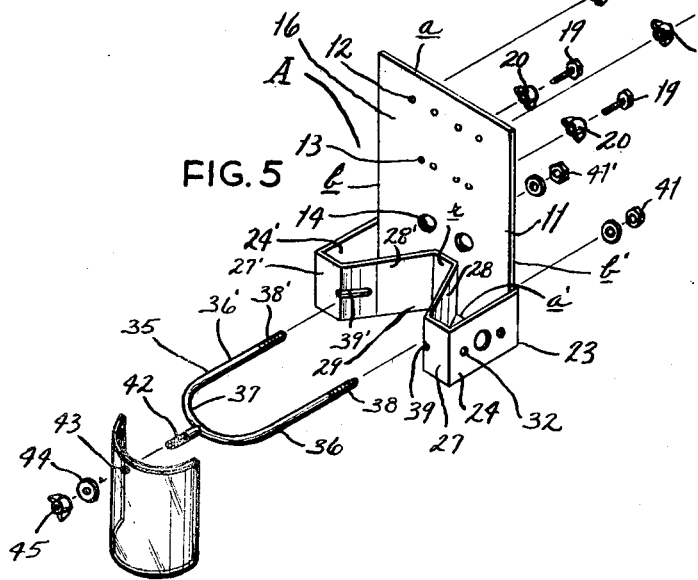
FIG. 5 is an exploded perspective view of the router adapter.
Figure 4:
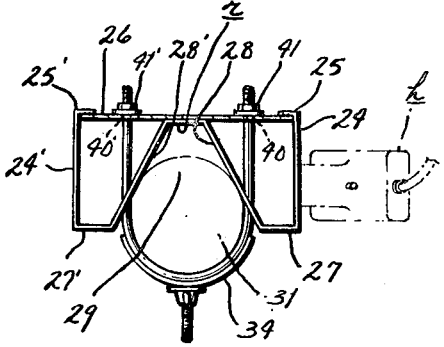
FIG. 4 is a horizontal transverse sectional view taken on the line 4—4 of FIG. 2.

With particular reference to FIG. 5, A designates a router adapter comprising a plate 11 which may be of any suitable configuration, but shown as rectangular having upper and lower end margins a, a', respectively, and side margins b, b'. Said plate 11 is provided with a plurality of vertically spaced apart series of horizontally aligned apertures, as at 12, 13, and 14 the same being in descending order; with the lowermost series 14 being located within substantially the center transverse zone of plate 11 and hence being positioned spacedly above lower margin a' of plate 11. The apertures in series 12 and 13 are respectively presented for alignment with openings (not shown) drilled or otherwise formed in bracket 7 for projection through at least a pair of registering apertures and openings of screws 15 or like fasteners, the outer ends of which will be presented beyond the outward face 16 of plate 11; said screws 15 being engaged in their end portions with wing nuts 17; and disposed upon the stems of screws 15 between arm 7 and plate 11 may be one or more spacers 18. Similarly the apertures constituting series 13 are aligned with openings (not shown) in bracket plate 7 with at least a pair of screws 19 extending through selected apertures and openings and engaged on the outer ends thereof are wing nuts 20; with there being spacers 21 disposed encirclingly of the stems of screws 19 for assurance of presentation of plate 11 in desired spatial relationship to bracket arm 7. The apertures constituting series 14 are dimensioned for receiving or permitting passage therethrough of the fastening nuts 22 disposed upon the related bolts or screws securing saw motor 8 upon the arms of bracket 6. Router adapter in its lower portion below aperture series 14 embodies a router support element 23 formed of a section of strip-material and contured to form parallel end walls 24, 24' which are planarwise perpendicular to plate 11 and project outwardly beyond outer face 16; each of said end walls 24, 24' at the normally inner ends thereof are inturned to develop flanges 25, 25', respectively, for rigid affixation to the confronting portion of the rearward face 26 of plate 11, as by welding or the like. At the outer or plate-remote ends of each end wall 24, 24', element 23 is bent inwardly to form relatively narrow front wall portions 27, 27', respectively, said latter being continuous at the ends remote from walls 24, 24' with inwardly converging wall sections 28, 28', respectively, which terminate at plate 11 whereby a short interconnecting section r is disposed flatwise against the adjacent portion of plate 11 and made rigid therewith, as by spot welds. Converging wall sections 28, 28' are so related, and at such an angle to plate 11 and to each other as to provide an outwardly opening recess 29 there between for constituting a fixed seat for the lower rearward portion of the casing 30 of motor 31 of a router of conventional character, being preferrably within the range of approximately three to four and one-half inches in diameter.

Disposed in wall 24 of support element 23 is a series of openings, as at 32, of appropriate diameter for effecting facile reception of the mounting screws (not shown) of a router handle h of usual character and incorporating a control switch and conductors or energizable leads for router R; said handle h does not form a part of the present invention.

Provided for disposition against the outer lower portion of router casing 30 in general covering relationship to the router bit 33 is a safety shield 34 of arcuate form in cross-section and being, desirably, fabricated of transparent material having sufficient thickness for integrity of form such material being glass or plastic such as Plexiglas.*

* Plexiglas is a trademark of Rohm & Hass for cast acrylic resin thermoplastic sheets.

Shield 34 is formed on such a radius as to render same substantially complementary to the lower portion of casing 30 of router motor 31 in order to embrace the outer portion thereof and thus cooperate with recess 29 for snuggly maintaining said motor 31 in stable condition for router operation. Shield 34 is removably retained in operative position by means of a U-shaped bolt 35 having elongated legs 36, 36' continuous in the outer portions thereof with a curvate web 37. The free ends of legs 36, 36' of externally threaded at 38, 38', respectively, for extension through slot-like openings 39, 39', respectively, in converging wall sections 28, 28', respectively, and aligned openings 40, 40' (not shown) but suggested at 40, 40', respectively, in plate 11 with there being nuts and washers as at 41, 41' secured upon the projecting end extremities of thread portions 38, 38'.

Integral with bolt 35 and extending outwardly from the central point of web 37 in a direction opposite to legs 36, 36' and having screw section 42 which projects through an opening 43 provided in the upper central portion of shield 34 and with there being spacer 44 and wing nut 45 for engagement upon the extended portion of screw 42 thereby maintaining shield 34 tightly against arcuate web 37.

Adapter A may be mounted upon saw 1 in a simple and quickly effected manner. Saw blade s is removed from shaft 9 and bracket or yoke 5 is swung about the carriage pivot (not shown) into the position shown in FIGS. 1, 2, 3 whereby shaft 9 is axially perpendicular to arm 3, such movement normally encompassing a swing through an arc of approximately 90°. Using plate 11 of adapter A as a template, the openings in bracket arm 7 are drilled to assure of registration with the apertures constituting the series 12, 13, and 14 on plate 11. Screws 15, 19 as of the cap variety, with spacers 18, 21, respectively, (which may be flat washers and hex nuts) engaged thereon are then inserted through the formed openings and aligned plate apertures for effecting tight, stable securement of plate 11 upon bracket arm 7; the particular sets of openings and apertures, expectedly, being used which permits the desired disposition of adapter A in view of the character of bracket arm 7 which may vary from saw to saw depending upon the manufacture thereof. Wing nuts 17, 20 are then snugly threaded on the outer projecting ends of screws 15, 19 to complete installation of adapter A upon saw 1.

It is to be particularly noted that adapter A of the present invention is uniquely constructed for securement upon arm 7 of bracket or yoke 6 which arm is widthwise parallel with the axis of the saw motor shaft 9 so that said adapter A is located remote from said shaft 9 and the adjacent portions of the saw motor 8. This is a marked contradistinction from prior art efforts wherein router fixtures have been designed for direct securement to the saw motor shaft. Furthermore, it is to be observed that router adapter A is in no way directly attached to the arm 3 of radial saw 1 so that no conceivable interference would be effected with respect to the adjustability of said saw arm as to render the adapter A with the supported router R correspondingly less adjustable.

Handle h is then disengaged from router R for reassembly upon adapter A by suitable fasteners securing same within openings 32 of adapter side wall 24. It is, of course, understood that the connection of handle h is dependent upon the particular construction of the associated router, as it is recognized that all routers useful with the present invention may not embody such a handle.

Router R is thereupon mounted on adapter A by addressing the compatible portion of casing 30 to adapter recess 29; and then insert legs 36, 36' through openings 39, 39' and at the registering openings 40, 40' in bracket 7, after which the threaded projecting ends are engaged by nuts 41, 41'. Thus legs 36, 36' serve as draw bands for reliably retaining router R within the adapter A, as through the coordinating clamping action of converging wall sections 28, 28' and U-shaped bolt 35; as web 37 is curved complementary to the accepted portion of casing 30 it embraces same in a fixed manner.

To complete the assembly, and hence the conversion of saw 1 for routing action, safety shield 34 is mounted by passing opening 43 therein relatively along screw portion 42 extending outwardly from bolt web 37; and with washer 44, and wing nut 45 being engaged tightly upon the now projecting external threading of screw portion 42, assuring of integrity of position of shield 34 with respect to router R and bit 32 carried thereby.

Accordingly the entire operation of conversion of the radial saw to a router is accomplished by nothing more than the tightening of a series of nuts or screws, as by a hand tool, so that the average individual with skill sufficient to effect the usual home work shop endeavor may easily make the requisite steps.

It is clear from the foregoing that restoration of saw 1 to its original or router-free condition is achieved by merely a reversal of the procedures needed to effect the conversion assembly so that there would appear no necessity of reciting the same in a step by step manner.

The critical aspect of the present invention, and hence its marked contribution to the art, is that adapter A is so uniquely constructed as to render, when mounted, an erstwhile radial arm saw into a general purpose router, allowing not only pin-router operation, but over-arm use since both lateral and vertical movement and adjustment is available. Thus it not only utilizes the usual rack and pinion gear of a radial arm saw but also the lateral movement of the router tool. Thereby clamping of the work, such as woodwork, is allowed for greater accuracy in routing and design work. The inventive nature of adapter A, rendering it mountable upon a base structure for a radial saw provides maximum routing versatility, so that decorative edging, free-handing curving, in-lay work and mortising pin routing can be achieved. Many of such techniques may be performed with both hands free to retain the workpiece in position.

Thus by conversion through use of the present invention, the home radial saw may thus be endowed with capabilities which have heretofore only been associated with large, commercial machines.

It is to be especially noted that adapter A does not necessitate any direct attachment to the saw arm but is secured solely to the swingable saw motor bracket or yoke. Thus there is obviated any inhibiting force on the arm so that it is free to swing within a horizontal arc independently of the particular attitude of the motor bracket or yoke, thereby assuring that router A will be accorded the full extent of adjustability provided the saw.

What is claimed is:

1. For use with a radial arm saw having a carriage for longitudinal movement along the arm of the saw, there being a U-shaped bracket depending from said carriage for movement therewith and having parallel arms planarwise perpendicular to the longitudinal axis of said arm, a saw motor having a motor shaft, means securing said motor to said carriage arms for disposition therebetween and with the motor shaft having its longitudinal axis parallel to the plane of said bracket arms, the improvement comprising a router adapter for supporting a router for movement with said carriage for disposing said router in desired operative position, said adapter having a mounting plate, means detachably securing said mounting plate upon the exterior face of one of said bracket arms in planarwise parallel relationship thereto, a fixed, outwardly opening receptacle-forming member secured to said mounting plate for presentation on the side thereof remote from the adjacent motor bracket arm, said member being dimensioned for accepting an inner portion of the router, an adjustable clamping element comprising a U-shaped bolt having parallel legs engageable upon said mounting plate for cooperating with said receptacle-forming member for maintaining said router in operative position with the longitudinal axis thereof perpendicular to the longitudinal axis of said carriage.

2. A router adapter as defined in claim 1 and further characterized by said U-shaped bolt having an arcuate web portion intervening the parallel legs thereof, a safety shield, and means detachably securing said safety shield upon the arcuate web of said U-shaped bolt for dependency therefrom for protecting the user against material fragments dislodged from the work by the router.

3. A router adapter as defined in claim 2 wherein said means for detachably securing said safety shield comprise a bolt fixed to said U-bolt web and projecting outwardly thereof in axial parallel relationship to the legs of said bolt, said safety shield having an opening for extension therethrough of said bolt extending from said U-bolt web, and locking means for engaging the projecting portion of the said bolt.

4. A router adapter as defined in claim 3 and further characterized by the fixed receptacle-forming member being located in the lower portion of said mounting plate, said means engaging said mounting plate to the adjacent arm of said motor bracket engaging said mounting plate in its upper portion, and spacer means between said mounting plate and the adjacent motor bracket arm.

5. A router adapter as defined in claim 2 wherein the upper end of said mounting plate is spacedly below and free of engagement with the arm of the saw.

* * * * *